United States Patent
Kim et al.

(10) Patent No.: US 11,225,056 B2
(45) Date of Patent: *Jan. 18, 2022

(54) SANDWICH PANEL AND A MANUFACTURING METHOD THEREOF

(71) Applicant: LG Hausys, Ltd., Seoul (KR)

(72) Inventors: Won Kim, Incheon (KR); Myung Lee, Gyeonggi-do (KR); Dayoung Yu, Gyeonggi-do (KR); Jiwon Lim, Seoul (KR); Sang Hyun Rho, Gyeonggi-do (KR); Dongmin Song, Seoul (KR); Seongmoon Jung, Daejeon (KR)

(73) Assignee: LG Hausys, Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/861,855

(22) Filed: Apr. 29, 2020

(65) Prior Publication Data

US 2020/0269549 A1 Aug. 27, 2020

Related U.S. Application Data

(60) Division of application No. 16/215,020, filed on Dec. 10, 2018, which is a continuation of application No.
(Continued)

(30) Foreign Application Priority Data

Jun. 10, 2016 (KR) .................. 10-2016-0072149
Jun. 9, 2017 (KR) .................. 10-2017-0072712
(Continued)

(51) Int. Cl.
*B32B 15/14* (2006.01)
*B32B 15/18* (2006.01)
(Continued)

(52) U.S. Cl.
CPC .............. *B32B 15/14* (2013.01); *B32B 5/022* (2013.01); *B32B 7/12* (2013.01); *B32B 15/18* (2013.01);
(Continued)

(58) Field of Classification Search
CPC ........... B32B 15/14; B32B 5/022; B32B 7/12; B32B 37/12; B32B 38/0036;
(Continued)

(56) References Cited

U.S. PATENT DOCUMENTS 6,080,495 A 6/2000 Wright
6,171,705 B1 * 1/2001 Clifford .................. B32B 15/04
428/464
(Continued)

FOREIGN PATENT DOCUMENTS

CN 101410564 A 4/2009
EP 2889438 A1 7/2015
(Continued)

OTHER PUBLICATIONS

"PET Properties", PolymerProcessing.com, 2000, https://www.polymerprocessing.com/polymers/PET.html (Year: 2000).*
(Continued)

*Primary Examiner* — Jasper Saberi
(74) *Attorney, Agent, or Firm* — Lerner, David, Littenberg, Krumholz & Mentlik, LLP

(57) ABSTRACT

The present invention relates to a sandwich panel and a method of manufacturing the same. The sandwich panel according to the present invention has high density and improved physical properties such as flexural strength, flexural modulus, bending strength and lightening weighting ratio and is suitable for use in various consumer products or industrial materials.

21 Claims, 3 Drawing Sheets

Related U.S. Application Data

PCT/KR2017/006081, filed on Jun. 2, 2017, and a continuation-in-part of application No. PCT/KR2017/006084, filed on Jun. 12, 2017.

(30) Foreign Application Priority Data

| | | |
|---|---|---|
| Jun. 9, 2017 | (KR) | 10-2017-0072733 |
| Jun. 9, 2017 | (KR) | 10-2017-0072757 |
| Mar. 2, 2018 | (KR) | 10-2018-0025319 |
| Mar. 2, 2018 | (KR) | 10-2018-0025329 |
| Mar. 2, 2018 | (KR) | 10-2018-0025337 |
| Mar. 2, 2018 | (KR) | 10-2018-0025340 |
| Mar. 2, 2018 | (KR) | 10-2018-0025343 |

(51) Int. Cl.
 B32B 15/20 (2006.01)
 B32B 37/18 (2006.01)
 B32B 7/12 (2006.01)
 B32B 38/00 (2006.01)
 B32B 5/02 (2006.01)
 B32B 37/12 (2006.01)
 E04C 2/292 (2006.01)
 B32B 37/02 (2006.01)

(52) U.S. Cl.
 CPC ............ *B32B 15/20* (2013.01); *B32B 37/12* (2013.01); *B32B 37/182* (2013.01); *B32B 38/0036* (2013.01); *B32B 37/02* (2013.01); B32B 2037/1253 (2013.01); B32B 2250/03 (2013.01); B32B 2250/40 (2013.01); B32B 2260/021 (2013.01); B32B 2260/046 (2013.01); B32B 2262/0276 (2013.01); B32B 2262/0284 (2013.01); B32B 2262/12 (2013.01); B32B 2305/07 (2013.01); B32B 2305/20 (2013.01); B32B 2305/72 (2013.01); B32B 2307/308 (2013.01); B32B 2307/538 (2013.01); B32B 2307/54 (2013.01); B32B 2307/546 (2013.01); B32B 2307/734 (2013.01); B32B 2309/02 (2013.01); B32B 2309/04 (2013.01); B32B 2311/24 (2013.01); B32B 2311/30 (2013.01); B32B 2367/00 (2013.01); B32B 2607/00 (2013.01); E04C 2/292 (2013.01)

(58) Field of Classification Search
 CPC .......... B32B 2250/40; B32B 2260/021; B32B 2305/20; B32B 2307/54; B32B 2307/734; B32B 2307/538; B32B 2307/308; B32B 37/02; E04C 2/292
 See application file for complete search history.

(56) References Cited

U.S. PATENT DOCUMENTS

| | | | |
|---|---|---|---|
| 6,855,432 B1 | 2/2005 | Hojabr et al. | |
| 2006/0141260 A1 | 6/2006 | Haque et al. | |
| 2007/0207301 A1* | 9/2007 | Hanks | B32B 27/20 428/292.1 |
| 2008/0248278 A1* | 10/2008 | Fisher | B32B 5/02 428/304.4 |
| 2008/0299367 A1* | 12/2008 | Yamamoto | D04H 1/55 428/219 |
| 2009/0130939 A1* | 5/2009 | Kimura | D06M 11/82 442/364 |
| 2009/0317591 A1 | 12/2009 | Sato et al. | |
| 2010/0040902 A1 | 2/2010 | Mizrahi | |
| 2011/0108218 A1 | 5/2011 | Flack | |
| 2015/0175801 A1 | 6/2015 | Kim | |
| 2016/0023440 A1 | 1/2016 | Irazu Echeverria et al. | |
| 2017/0119226 A1 | 5/2017 | Nakayama et al. | |
| 2017/0305783 A1 | 10/2017 | Faynot et al. | |
| 2018/0190532 A1 | 7/2018 | Sugiyama et al. | |
| 2019/0071265 A1 | 3/2019 | Masuda et al. | |

FOREIGN PATENT DOCUMENTS

| | | |
|---|---|---|
| JP | H06238791 A | 8/1994 |
| JP | 2006192800 A | 7/2006 |
| JP | 2010215825 A | 9/2010 |
| JP | 2013063605 A | 4/2013 |
| JP | 2015068485 A | 4/2015 |
| JP | 2015071794 A | 4/2015 |
| KR | 20070107015 A | 11/2007 |
| KR | 100850765 B1 | 8/2008 |
| KR | 20090009222 A | 1/2009 |
| KR | 20090068256 A | 6/2009 |
| KR | 20110125889 A | 11/2011 |
| KR | 101465595 B1 | 11/2014 |
| KR | 101500036 B1 | 3/2015 |
| KR | 101744794 B1 | 6/2017 |
| KR | 20170077985 A | 7/2017 |
| KR | 20170140111 A | 12/2017 |
| TW | 201343407 A | 11/2013 |
| WO | 2008108295 A1 | 9/2008 |
| WO | 2014083200 A1 | 6/2014 |
| WO | 2015194563 A1 | 12/2015 |

OTHER PUBLICATIONS

"DuPont BYNEL 4003", Songhan Plastic Technology Co, http://www.lookpolymers.com/polymer_DuPont-Bynel-4003-Anhydride-Modified-HDPE-Adhesive-Resin-nbspdiscontinued-.php (Year: 2020).*
"DuPont BYNEL 4206", Songhan Plastic Technology Co, http://www.lookpolymers.com/polymer_DuPont-Bynel-4206-Anhydride-Modified-LDPE-Adhesive-Resin.php (Year: 2020).*
"Water Absorption 24 Hour—(ASTM D570) Test of Plastics", 2015, Omnexus, https://omnexus.specialchem.com/polymer-properties/properties/water-absorption-24-hours (Year: 2015).*
"PPE (Poly-Phenylene Ether)", 2003, Fast Heat, http://www.fastheatuk.com/mdb/ppe.html (Year: 2003).*
"Dow BYNEL", 2021, Dow, https://www.dow.com/ (Year: 2021).*
"Recycling of Polyethylene Terephthalate", G.P. Thomas, Jul. 24, 2012, AZO Cleantech, https://www.azocleantech.com/article.aspx?ArticleID=254 (Year:2012).
Search Report from 1st Office Action for Chinese Application No. 201780049038.X dated Apr. 27, 2020; 2 pages.
Database WPI Week 200925 Thomson Scientific, London, GB; AN 2009-F01334, XP002796659.
Extended European Search Report including Written Opinion for Application No. EP17810600 dated Jan. 24, 2020.
International Search Report for PCT/KR2017/006079 dated Sep. 20, 2017.
International Search Report for PCT/KR2017/006081 dated Sep. 20, 2017.
International Search Report for PCT/KR2017/006082 dated Sep. 20, 2017.
International Search Report for PCT/KR2017/006084 dated Sep. 20, 2017.
International Search Report for PCT/KR2017/006085 dated Sep. 20, 2017.
Matweb, "Overview of materials for EVOH", http://www.matweb.com/search/datasheettext.aspx?matguid=744899e4ab06482da9cf86d8f450db0d (Year: 2015), 2 pages.
PolymerProcessing.com, "PET Properties", poly(ethylene terephthalate), 2000, http://www.polymerprocessing.com/polymers/PET.html (Year: 2000), 2 pages.
Songhan Plastic Technology Co, "DuPont BYNEL 4003", http://www.lookpolymers.com/polymer_DuPont-Bynel-4003-Anhydride-Modified-HDPE-Adhesive-Resin-nbspdiscontinued-.php (Year: 2020), 2 pages.

(56) References Cited

OTHER PUBLICATIONS

Songhan Plastic Technology Co, "DuPont BYNEL 4206", http://www.lookpolymers.com/polymer_DuPont-Bynel-4206-Anhydride-Modified-LDPE-Adhesive-Resin.php (Year: 2020), 2 pages.

* cited by examiner

【Figure 1】
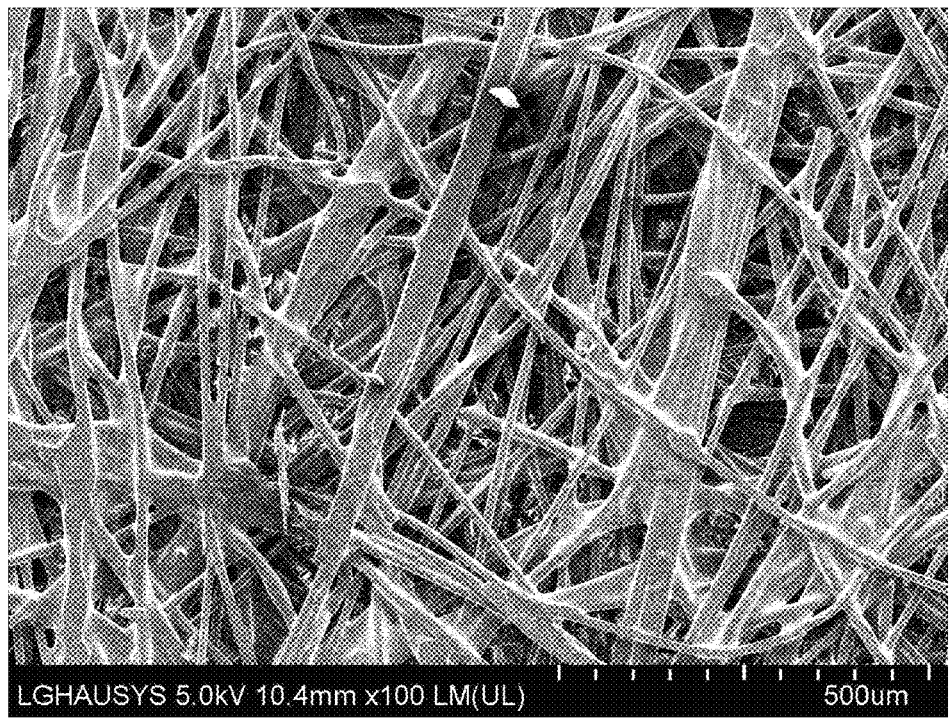
【Figure 2】
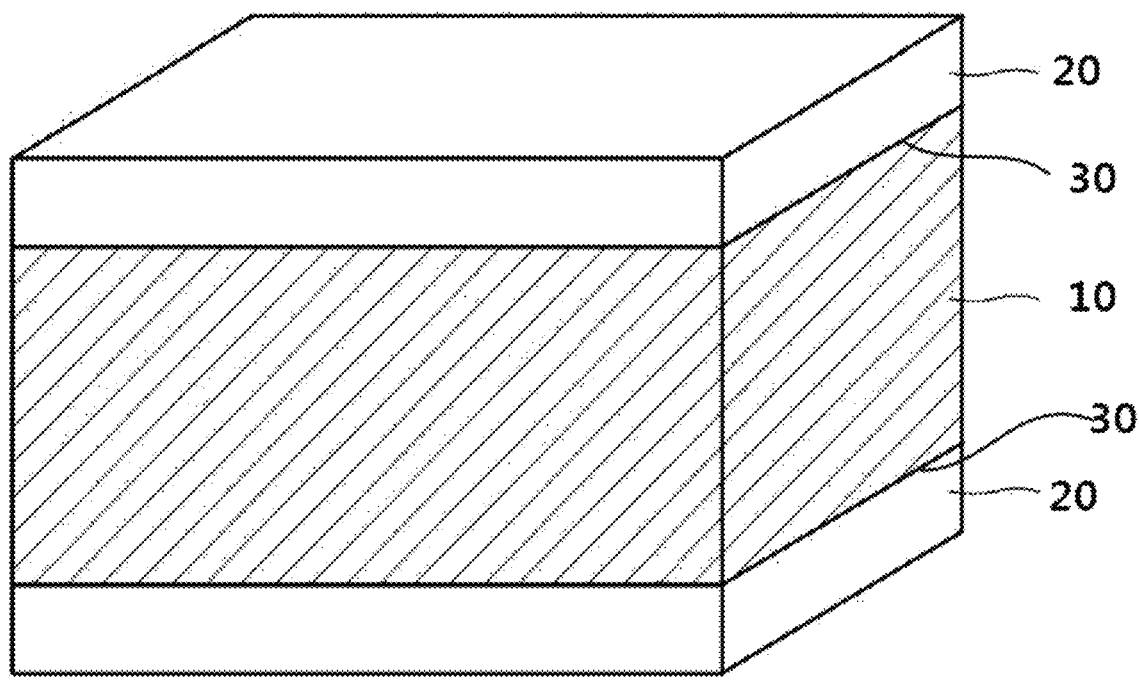

【Figure 3】
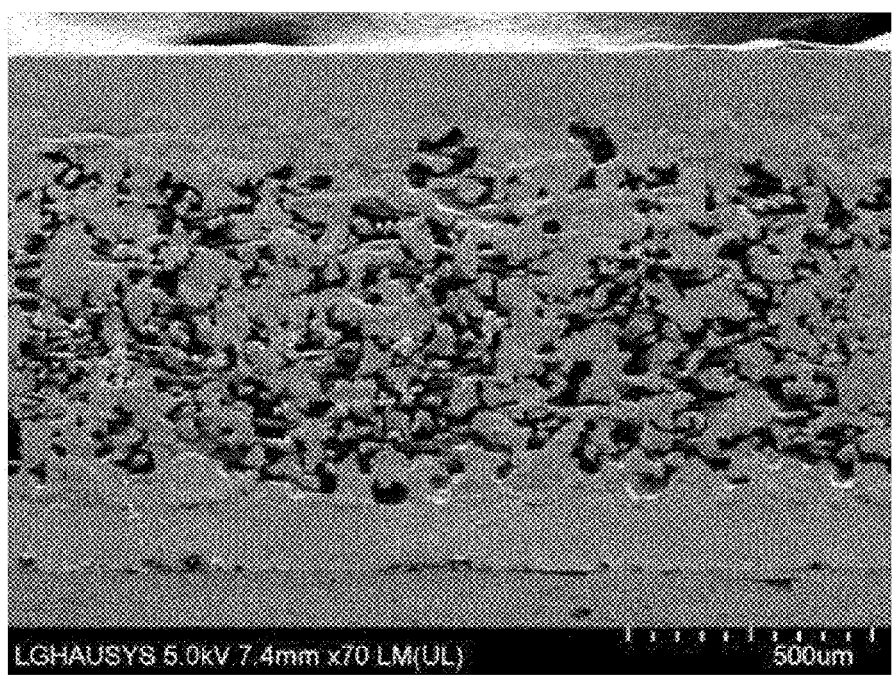

[Figure 4]
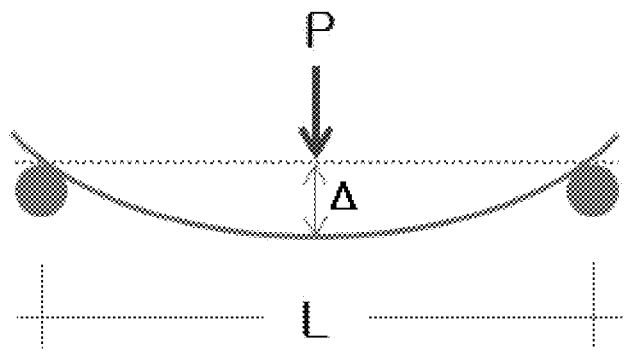
$$\Delta = \Delta_1 + \Delta_2 = \frac{PL^3}{48D} + \frac{PL}{4V}$$
(flexural) (shear)
$\Delta_1$ : deflection by flexure (mm)
$\Delta_2$ : deflection by shear (mm)
P : total applied force (N)
L : span length (mm)
D : flexural stiffness (N*mm$^2$)
V : transverse shear rigidity (N)

SANDWICH PANEL AND A MANUFACTURING METHOD THEREOF

CROSS-REFERENCE TO RELATED APPLICATIONS

This application is a divisional of U.S. application Ser. No. 16/215,020, filed on Dec. 10, 2018, which is a continuation-in-part of International Application No. PCT/KR2017/006081, filed on Jun. 12, 2017, which claims priority from Korean Patent Application No. 10-2016-0072149, filed Jun. 10, 2016, Korean Patent Application No. 10-2017-0072712, filed Jun. 9, 2017, and Korean Patent Application No. 10-2017-0072733, filed Jun. 9, 2017. This application is also a continuation-in-part of International Application No. PCT/KR2017/006084, filed on Jun. 12, 2017, which claims priority from Korean Patent Application No. 10-2016-0072149, filed Jun. 10, 2016, and Korean Patent Application No. 10-2017-0072757, filed Jun. 9, 2017. This application also claims priority to Korean Patent Application No. 10-2018-0025319, filed on Mar. 2, 2018, Korean Patent Application No. 10-2018-0025329, filed on Mar. 2, 2018, Korean Patent Application No. 10-2018-0025337, filed on Mar. 2, 2018, Korean Patent Application No. 10-2018-0025340, filed on Mar. 2, 2018, and Korean Patent Application No. 10-2018-0025343, filed on Mar. 2, 2018. The disclosures of all of the above applications are incorporated herein by reference.

TECHNICAL FIELD

The present invention relates to a sandwich panel and a manufacturing method thereof.

BACKGROUND ART

Conventional sandwich panels are used in various fields such as construction materials and the like because they are effective for weight lightening while having a structural strength similar to that of a metal panel.

In these sandwich panels, the physical properties of the panels are controlled by forming a core layer between the skin layers formed from aluminum, iron and the like. For example, the weight lightening effect of the panel is increased by using a foamed resin material in the core layer, or the mechanical strength of the panel is increased by using a general resin, a composite or a balsa wood material.

However, such sandwich panels have insufficient weight lightening and mechanical strength and do not have excellent elongation, and thus have a limitation in application of the product. In addition, there is a problem that when the panel is formed by applying an adhesive between the skin layer and the core layer, the interlayer bonding force is weak and the formability is poor.

Korean Registered Patent No. 10-1500036 (Registered on Mar. 2, 2013) can be mentioned as a background technique related to the present invention, and this document discloses a sandwich panel and its manufacturing method.

However, in the case of such a sandwich panel, there is a problem in that it is difficult to ensure high-density, high-flexural strength and tension stiffness properties sufficient to be used as a packaging material for protecting a heavy load of cargo or the like.

Further, since the adhesive force between the core layer and the skin layer, which are different kinds of materials from one another, in the sandwich panel is deteriorated, there is a problem that the sandwich panel easily peels off due to external load or impact during use.

Technical Problem

In view of the above, the inventors of the present invention have performed studies on a sandwich panel using a molded object which has a high density and improved physical properties, such as flexural strength and tensile strength, and which improves the adhesion between the respective constituents of the sandwich panel, and the inventors have completed the present invention as a result.

Accordingly, an aspect of the present invention provides a sandwich panel having high density and enhanced properties, such as flexural strength or tensile strength.

Another aspect of the present invention provides a sandwich panel having an improved adhesion between a core layer and a skin layer, such that they are not easily peeled off by external load or impact during use of the sandwich panel.

Technical Solution

According to an aspect of the present invention, there is provided a sandwich panel comprising a core layer of non-woven fiber structure having a polyester-based fiber and a binder which has an apparent density of 0.5 g/cm³ to 0.8 g/cm; a skin layer laminated on at least one surface of the core layer; and an adhesive layer for bonding the core layer and the skin layer.

Herein, the surface roughness (Ra) of the core layer may be a range of 5 to 10 μm.

Herein, the surface roughness (Ra) of the core layer may be a range of 6 to 9 μm.

Herein, the coefficient of linear expansion of the adhesive layer (ACL: Adhesive Coefficient of Linear expansion), a coefficient of linear expansion of the core layer (CCL: Core Coefficient of Linear expansion), and a coefficient of linear expansion of the skin layer (SCL: Skin Coefficient of Linear expansion) may satisfy equation 1 and equation 2 below.

$$1.6 \leq ACL/CCL \leq 3.0 \quad \text{[Equation 1]}$$

$$3.0 \leq CCL/SCL \leq 6.5 \quad \text{[Equation 2]}$$

Herein, the coefficient of linear expansion of the adhesive layer (ACL: Adhesive Coefficient of Linear expansion), a coefficient of linear expansion of the core layer (CCL: Core Coefficient of Linear expansion), and a coefficient of linear expansion of the skin layer (SCL: Skin Coefficient of Linear expansion) may satisfy equation 3 and equation 4 below.

$$2.0 \leq ACL/CCL \leq 2.7 \quad \text{[Equation 3]}$$

$$3.5 \leq CCL/SCL \leq 5.0 \quad \text{[Equation 4]}$$

Herein, the binder may be a non-hygroscopic copolymer resin or a hygroscopic copolymer resin.

Herein, the polyester-based fiber may have a melting point of 180 to 300° C.

Herein, the core layer may have a flexural strength of 20 MPa to 80 MPa, a tensile strength of 50 MPa to 80 MPa, a flexural modulus of 1.0 GPa to 1.5 GPa and a tension stiffness of 1.0 GPa to 1.8 GPa, a tensile elongation of 10% to 30% and a peel-off strength of 150 N to 200 N.

Herein, the polyester-based fiber may be any one or more selected from the group consisting of polyethylene terephthalate (PET), polytrimethylene terephthalate, polybutylene terephthalate and polyethylene naphthalate.

Herein, the non-hygroscopic copolymer resin may have a weight change rate of less than 0.1% after keeping a constant temperature/constant humidity for 100 hours at a temperature of 85° C. and relative humidity of 85%.

Herein, the binder may have a melting point of 160° C. or higher.

Herein, the panel may further comprise a sheath-core type bicomponent fiber including a core part of a polyester-based fiber; and a sheath part which is a non-hygroscopic copolymer resin surrounding the core part.

Herein, the polyester-based fiber may be any one or more selected from the group consisting of polyethylene terephthalate (PET), polytrimethylene terephthalate, polybutylene terephthalate and polyethylene naphthalate.

Herein, the sheath part that is a non-hygroscopic copolymer resin may have a weight change rate of less than 0.1% after keeping a constant temperature/constant humidity for 100 hours at a temperature of 85° C. and relative humidity of 85%.

Herein, the thickness of the core layer may be a range of 0.1 to 10 mm and the thickness of the skin layer is a range of 0.1 to 0.5 mm.

Herein, the skin layer may be at least one selected from the group consisting of aluminum, iron, stainless steel (SUS), magnesium and electro galvanized steel sheet (EGI).

Herein, the adhesive layer may include at least one of an olefin-based adhesive, a urethane-based adhesive, an acrylic-based adhesive, and an epoxy-based adhesive.

Herein, the adhesive layer may comprise a first adhesive layer comprising high density polyethylene (HDPE) and a second adhesive layer comprising low density polyethylene (LDPE), wherein the core layer is bonded to the first adhesive layer, and the skin layer is bonded to the second adhesive layer.

Herein, the density of the high density polyethylene (HDPE) may be in a range of 0.940 to 0.965 g/cm$^3$, and the density of the low density polyethylene (LDPE) may be in a range of 0.910 to 0.925 g/cm$^3$.

Herein, the core layer may be produced through the needle punching process at a punching number of 300 to 1000 times per minute, a non-woven fabric moving speed of 1 to 8 m/min, and a punching density of 100 to 500 punches/cm$^2$.

Herein, the core layer may be manufactured by repeating two or more needle punching processes.

According to another aspect of the present invention, there is provided a method for manufacturing a sandwich panel comprising: a) preparing a core layer of non-woven fiber structure having a polyester-based fiber and a binder which has an apparent density of 0.5 g/cm$^3$ to 0.8 g/cm; b) forming an adhesive layer on at least one surface of the core layer; and c) forming a skin layer on the adhesive layer.

Herein, the step c) may involve forming a skin layer by photo-curing or thermal-curing after laminating the core layer, the adhesive layer and the skin layer.

Herein, the thermal-curing may be performed at the temperature of 50 to 110° C. for 5 minutes to 2 hours.

Herein, the thermal-curing may be performed at room temperature for 1 to 10 hours.

Herein, the step a) may comprise a1) preparing a non-woven fiber; and a2) performing a needle punching process on the non-woven fiber at a punching number of 300 to 1000 times per minute, a non-woven fabric moving speed of 1 to 8 m/min, and a punching density of 100 to 500 punches/cm2 to produce a core layer;

Herein, in the step a2), the needle punching process may be performed on the non-woven fiber at a punching number of 400 to 700 times per minute, a non-woven fabric moving speed of 1.5 to 6 m/min, and a punching density of 200 to 400 punches/cm$^2$.

Advantageous Effects

A sandwich panel according to the present invention has high density and enhanced properties, such as flexural strength or tensile strength, has a small weight change caused by moisture absorption even when used for a long period of time, and has small changes in flexural strength, tensile strength and the like, and therefore it is suited to be used in structural members for home appliances (TV back covers, boards for washing machines, and the like), interior and exterior boards for construction, automotive interior and exterior materials, interior and exterior materials for trains/ships/airplanes, various partition boards, elevator structural members, panels used to form shipping containers, and the like.

DESCRIPTION OF DRAWINGS

FIG. 1 is an image observing a molded object according to the present invention using Field Emission-Scanning Electron Microscopy (FE-SEM).

FIG. 2 is a schematic diagram of a sandwich panel according to the present invention.

FIG. 3 is a photograph of a cross section of a sandwich panel according to the present invention observed by FE-SEM (Field Emission-Scanning Electron Microscopy).

FIG. 4 is a mimetic diagram showing a method for measuring 3-point mid-span loading of a sandwich panel according to the present invention.

BEST MODE

The advantages and features of the present invention, and the method of accomplishing them, will become apparent with reference to the following detailed description in conjunction with the accompanying drawings. However, the present invention is not limited to the embodiments disclosed below but may be embodied in various different forms. Rather, these embodiments are provided only so that this disclosure will be thorough and complete and will fully convey the scope of the invention to those who have ordinary skills in the art. The present invention is only defined by the scope of the claims. The same reference numerals refer to the same elements throughout the specification.

Sandwich Panel

Referring to FIG. 2, the sandwich panel according to the present invention comprises a core layer 10 of non-woven fiber structure having a polyester-based fiber and a binder which has an apparent density of 0.5 g/cm$^3$ to 0.8 g/cm; a skin layer 20 laminated on at least one surface of the core layer; and an adhesive layer 30 for bonding the core layer and the skin layer.

Based on experiments conducted by the inventors of the present invention, physical properties of conventional sandwich panels, such as flexural strength and tensile strength, are lower than desired, and the transverse shear rigidity and deflection degree of such panels are especially problematic. Thus, there has been a need for improvement in the use of structural materials for home appliances (TV back covers, washing machine boards, etc.), interior and exterior boards for buildings, interior and exterior materials for cars, interior and exterior materials for trains, ships and airplanes, various partition boards, elevator structural materials and the like.

However, the present inventors have come to manufacture a sandwich panel having improved physical properties, such as flexural strength and tensile strength, by manufacturing a sandwich panel comprising a core layer 10 of non-woven fiber structure having a polyester-based fiber and a binder which has an apparent density of 0.5 g/cm$^3$ to 0.8 g/cm$^3$.

In addition, the adhesive strength between the core layer and the skin layer, which are different kinds of materials from one another, is improved in the structure of the sandwich panel, so that even when the sandwich panel is used for a long time in a high temperature and high humidity environment, peeling is not easily caused by external load or impact during use of the sandwich panel. As a result, it has become possible to manufacture sandwich panels suitable for use as consumer products or industrial materials.

Further, the sandwich panel according to the present invention limits the surface roughness (Ra) of the core layer and adjusts the surface roughness of the core layer surface that is in contact with the adhesive layer. Therefore, the adhesive layer is sufficiently impregnated in the core layer, so that peeling does not occur. Further, the adhesive strength to the skin layer can be improved, and the problem of delamination in the sandwich panel can be reduced.

In the sandwich panel according to the present invention, the surface roughness (Ra) of the core layer satisfies the range of 5 to 10 μm. Therefore, the peel strength between the core layer, the skin layer and the adhesive layer is improved, and the peel strength can be in the range of 150 to 200 N, preferably in the range of 160 to 180 N. Herein, the peel strength of the core layer is measured on the basis of KSF 4737.

If the surface roughness (Ra) of the core layer is less than 5 μm, there is no effect of improving the adhesion. If the surface roughness Ra of the core layer is more than 10 μm, the adhesive layer cannot sufficiently fill the inside and becomes void.

Also, in the sandwich panel according to the present invention, the coefficient of linear expansion of the adhesive layer (ACL: Adhesive Coefficient of Linear expansion), a coefficient of linear expansion of the core layer (CCL: Core Coefficient of Linear expansion), and a coefficient of linear expansion of the skin layer (SCL: Skin Coefficient of Linear expansion) may satisfy equation 1 and equation 2 below, $1.6 \leq ACL/CCL \leq 3.0$     [Equation 1]

$3.0 \leq CCL/SCL \leq 6.5$     [Equation 2]

Preferably, may satisfy equation 3 and equation 4 below, $2.0 \leq ACL/CCL \leq 2.7$     [Equation 3]

$3.5 \leq CCL/SCL \leq 5.0$     [Equation 4]

Since the core layer, the skin layer and the adhesive layer of the sandwich panel according to the present invention satisfy the above-described relationship, the difference in degree of linear expansion due to temperature rise is reduced. Therefore, even used for a long time at a high temperature, the degree of linear expansion between the core layer and the adhesive layer, which share an interface with each other, can be suppressed to a certain level. In addition, since the degree of linear expansion between the core layer and the skin layer, which is a main component for manifesting the mechanical strength of the sandwich panel, is controlled to a certain level, it is possible to reduce the problems that are caused by expanding or contracting of the core layer and the skin layer as temperature changes.

Accordingly, the sandwich panel according to the present invention can improve the peel strength of the core layer, the skin layer and the adhesive layer by satisfying the relations of the above-mentioned formulas 1 to 4, and can have peel strength in the range of 150 to 200 N, preferably in the range of 160 to 180N. Herein, the peel strength of the core layer is measured on the basis of KSF 4737.

The core layer of the sandwich panel according to the present invention may have a coefficient of linear expansion of 30 to 60 ppm/K and preferably a coefficient of linear expansion of 35 to 55 ppm/K.

The sandwich panel according to the present invention includes a core layer of non-woven fiber structure having a polyester-based fiber and a binder which has an apparent density of 0.5 g/cm$^3$ to 0.8 g/cm$^3$.

In the present invention, the term 'non-woven fiber structure' refers to that formed by bonding a fiber assembly of a web phase or a sheet phase with an adhesive, or bonding the fiber assembly using a thermoplastic fiber. Since the core layer according to the present invention has a non-woven fiber structure in which fibers are entangled with each other, all or a part of the polyester-based fibers are fused by the binder, so that natural pores are contained in the core layer, and thus air permeability can be improved and weight lightening can be improved. In other words, since the core layer has natural pores formed by entangling fibers with each other, the core layer is a non-foamed core, unlike the case where artificial pores are formed by additives such as foaming agent, and thus the manufacturing cost can be reduced, the foaming process can be omitted, thereby enhancing the process efficiency.

The average length of the polyester-based fibers included in the core layer according to the present invention is preferably 5 to 100 mm. If the average length of the fibers is less than 5 mm, it may be difficult to expect the effect of the high elongation because of the short length of the fibers. On the contrary, if the average length exceeds 100 mm, since the content of fibers that are entangled with each other increases, the space occupied by gaps in the core layer may be reduced. In addition, if the average length exceeds 100 mm, the fibers may not be dispersed smoothly during the manufacture of the core layer, and thus the physical properties of the core layer may be lowered.

The binder contained in the core layer may be a non-hygroscopic copolymer resin or a hygroscopic copolymer resin.

In particular, the non-hygroscopic copolymer resin used in the present invention refers to a resin having a property of not absorbing moisture in the air. The non-hygroscopic copolymer resin used in the present invention is not particularly limited as long as it has a non-hygroscopic property, and as specific examples, PS(Polystyrene), PVC(Poly (vinyl chloride), PMMA(Poly(methyl methacrylate), ABS (acrylonitrile butadiene styrene copolymer), PP(Polypropylene), PE(polyethylene) and the like may be used. Specifically, the resin may be one having a weight change ratio (i.e., the rate of increase in water content) of the molded article after being left at 85° C. and 85% relative humidity for 100 hours of less than 0.1%, preferably less than 0.08%, more preferably less than 0.07%.

Generally, in view of the fact that the degree of hygroscopicity of the PET fiber contained in the molded article is less than 0.05%, the fact that the weight change ratio of the molded article exceeds 0.05% means that the amount of water absorbed by the binder, which is another constitution in the molded article, is considerable. In this regard, the non-hygroscopic copolymer resin used in the present invention means that it has a low water absorption rate to such an extent that the weight change ratio (i.e., the rate of increase in water content) of the molded article after being left at 85° C. and 85% relative humidity for 100 hours is less than 0.1%, preferably less than 0.08%, more preferably less than 0.07%.

The non-hygroscopic copolymer resin may be a polyester-based fiber and those that satisfy the water absorption rate as described above, which are produced by copolymerizing a diol-based monomer having strong crystallinity and excellent elasticity and an acid component capable of imparting flexibility.

Specifically, the polyester-based fiber may be at least one selected from the group consisting of polyethylene terephthalate (PET), polytrimethylene terephthalate, polybutylene terephthalate, and polyethylene naphthalate, the diol-based monomer may be at least one selected from the group consisting of neopentyl glycol, diethylene glycol, ethylene glycol, poly(tetramethylene) glycol, 1,4-butanediol, 1,3-propanediol, 1,6-hexanediol, 1,4-cyclohexane dimethanol and the like, and the acid component may be at least one selected from the group consisting of isophthalic acid, adipic acid, 2,6-naphthalenedicarboxylic acid, sebacic acid, succinic acid, and the like.

All or a part of the polyester-based fibers contained in the core layer according to the present invention are fused by a binder which is a non-hygroscopic resin, and the binder may have a melting point of 160° C. or more.

The core layer according to the present invention has an apparent density of 0.5 to 0.8 $g/cm^3$. By satisfying the above-mentioned density range, it is possible to have a mechanical strength sufficient for use in the packaging material for large cargoes and the like.

Specifically, the core layer according to the present invention has a flexural strength of 20 MPa to 80 MPa and a tensile strength of 50 to 80 MPa, which is excellent in mechanical strength. The bending strength of the core layer is measured in accordance with ASTM D790, and the tensile strength of the core layer is measured in accordance with ASTM D638.

In addition, the core layer according to the present invention has a flexural modulus of 1.0 to 1.5 GPa and a tensile stiffness of 1.0 to 1.8 GPa, which is excellent mechanical rigidity. The flexural modulus of the core layer is measured according to ASTM D790, and the tensile stiffness of the core layer is measured according to ASTM D638.

The core layer according to the present invention has a tensile elongation in a range of 10 to 30% and a peel strength in a range of 150 to 200 N, which is advantageous in that even if an external force acts, the core layer is not easily torn. The tensile elongation of the core layer is measured on the basis of ASTM D638, and the peel strength of the core layer is measured on the basis of KSF 4737.

Since the core layer according to the present invention satisfies the mechanical strength as described above, it can be included in the sandwich panel and thus used in structural materials for home appliances (TV back covers, washing machine boards, etc.), interior and exterior boards for buildings, interior and exterior materials for cars, interior and exterior materials for trains, ships and airplanes (partition boards, etc.), various partition boards, elevator structural materials, panels used to form shipping containers, and the like.

The core layer according to the present invention may further include a sheath-core type bicomponent fiber. The sheath-core type bicomponent fiber comprises a core part of a polyester-based fiber; and a sheath part which is a non-hygroscopic copolymer resin surrounding the core part. The sheath-core type bicomponent fiber may be included in the core layer according to the present invention, since those that were introduced during the manufacturing step of the core layer according to the present invention remain in the resin of the sheath part in a non-melted state.

The core part of the sheath-core type bicomponent fiber may be at least one selected from the group consisting of polyethylene terephthalate (PET), polytrimethylene terephthalate, polybutylene terephthalate, and polyethylene naphthalate.

The sheath part of the sheath-core type bicomponent fiber may be the same non-hygroscopic copolymer resin as the binder included in the core layer according to the present invention.

Specifically, the non-hygroscopic copolymer resin refers to a resin which does not absorb moisture in the air, and may specifically be a resin having a weight change ratio (i.e., a rate of increase in water content) of the molded article after being left at 85° C. and 85% relative humidity for 100 hours of less than 0.1%, preferably less than 0.08%, more preferably less than 0.07%, based on the molded article of the present invention produced by the resin.

Generally, in view of the fact that the degree of hygroscopicity of the PET fiber contained in the molded article is less than 0.05%, the fact that the weight change ratio of the molded article exceeds 0.05% means that the amount of water absorbed by the binder, which is another constitution in the molded article, is considerable. In this regard, the non-absorbable copolymer resin used in the present invention means that it has a low water absorption rate to such an extent that the weight change ratio (i.e., the rate of increase in water content) of the molded article after being left at 85° C. and 85% relative humidity for 100 hours is less than 0.1%, preferably less than 0.08%, more preferably less than 0.07%, based on the finally manufactured molded article.

The non-hygroscopic copolymer resin may be a polyester-based fiber and those that satisfy the water absorption rate, which are produced by copolymerizing a diol-based monomer having strong crystallinity and excellent elasticity and an acid component capable of imparting flexibility.

Specifically, the polyester-based fiber may be at least one selected from the group consisting of polyethylene terephthalate (PET), polytrimethylene terephthalate, polybutylene terephthalate, and polyethylene naphthalate, the diol-based monomer may be at least one selected from the group consisting of neopentyl glycol, diethylene glycol, ethylene glycol, poly(tetramethylene) glycol, 1,4-butanediol, 1,3-propanediol, 1,6-hexanediol, 1,4-cyclohexane dimethanol and the like, and the acid component may be at least one selected from the group consisting of isophthalic acid, adipic acid, 2,6-naphthalenedicarboxylic acid, sebacic acid, succinic acid, and the like.

The sheath-core type bicomponent fiber is prepared by melt spinning and stretching using the core part and the sheath part.

In addition, if the non-hygroscopic resin is used as a sheath component of a sheath-core type bicomponent fiber, flexural strength and tensile strength are improved, and a core layer can be manufactured by a dry process, thereby making it easy to produce a high-density core layer. A dry process refers to a process in which hot water vapor is not used in the process, and the fibers and binder can be combined with each other by heating to a temperature above the melting point of the binder in a high temperature oven.

Also, if the non-hygroscopic resin is used for the packaging material of large cargos and the like, the deflection phenomenon of the non-woven fabric can be prevented because of good physical properties and shape retention properties, even under the high temperature and a high humidity atmosphere.

In addition to this, the core layer according to the present invention may further include fillers such as a glass fiber, a carbon fiber, a polymer fiber and the like. Also, flame retardants such as a brominated organic flame retardant may be further included. In addition to this, additives such as an impact modifier and a heat stabilizer may be further included.

The manufacturing method of the core layer according to the present invention can be manufactured by the following method.

A method for manufacturing a core layer according to the present invention may be carried out as follows.

The method for manufacturing a core layer according to the present invention may include, a) preparing a non-woven fabric by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result; b) installing the prepared non-woven fabric on a plurality of unwinding devices, and then moving to a heating press; and c) manufacturing a core layer by heating and pressurizing a plurality of the non-woven fabrics moved to the heating press under a temperature condition of 170° C. to 210° C. and a pressure condition of 1 MPa to 10 MPa.

First, in a), a non-woven fabric is prepared by mixing (A) a polyester-based fiber and (B) a sheath-core type bicomponent fiber including a core part of a polyester-based fiber and a sheath part that is a non-hygroscopic copolymer resin surrounding the core part, and then heating and pressurizing the result.

In a), (A) the polyester-based fiber and B) the sheath-core type bicomponent fiber may be mixed in a weight ratio of 1:99 to 80:20, and used. When the content of B) the sheath-core type bicomponent fiber is less than the above-mentioned range, fusion between fibers is not sufficient, thus declining the properties of the non-woven fabric.

In a), common methods of preparing a non-woven fabric may be used as the method of preparing the non-woven fabric through heating and pressurizing, and as one example, the non-woven fabric may be prepared by carding mixed fibers using a roller carding machine, and then thermal bonding the result for 5 seconds to 30 seconds at a temperature of 160° C. to 210° C. using a heating press.

In some embodiments, in step a), after the non-woven fibers are mixed, heated, and pressed, a needle punching process can be performed to produce the non-woven fabric.

The needle punching process may be performed on the non-woven fiber at a punching number of 300 to 1000 times per minute, a non-woven fabric moving speed of 1 to 8 m/min, and a punching density of 100 to 500 punches/cm$^2$, and more preferably performed on the non-woven fiber at a punching number of 400 to 700 times per minute, a non-woven fabric moving speed of 1.5 to 6 m/min, and a punching density of 200 to 400 punches/cm$^2$.

If the number of punching per minute is less than 300, there is a problem that the degree of bonding between the non-woven fibers is reduced. If the number of punching per minute is more than 1000, there is a problem that the non-woven fiber is broken. Also, if the moving speed of the non-woven fabric is slower than 1 m/min, there is a problem that the production speed is too slow. if the moving speed of the non-woven fabric is higher than 8 m/min, there is a problem that the adjustment of punching density is not easy. Also, if the punching density is less than 100 punches/cm$^2$, there is a problem that the degree of binding between the non-woven fibers is reduced. If the punching density is more than 500 punches/cm$^2$, there is a problem that the non-woven fiber is broken.

The needle punching process may be performed two or more times. If the needle punching process is performed two or more times, it is possible to increase the binding force of the interlaminar fibers, thereby being effective to prevent the delamination between the layers.

By performing the needle punching process in the above range, the physical bond strength by needle punching is improved, and thus the physical property such as the tensile strength of the core layer is improved, and through this, the transverse shear rigidity and deflection degree of the final sandwich panel can be improved.

Specifically, after mixing the non-woven fibers, the carding is performed using a carding machine, followed by the needle punching process under the above conditions to produce a non-woven fabric having a basis weight of 1000 to 2500 gsm.

Next, in b), the prepared non-woven fabric is installed on a plurality of unwinding devices, and then moved to a heating press.

After installing 2 to 10 of the non-woven fabrics prepared in b) on a plurality of unwinding devices matching the number, the non-woven fabrics may be moved to a heating press for manufacturing a core layer. When using a plurality of non-woven fabrics using a plurality of unwinding devices as above, the thickness of each of the non-woven fabrics becomes small, and the length of the non-woven fabric wound on one unwinding device becomes long. Accordingly, the number of the use of joining machine for linking the non-woven fabrics continuously introduced during a continuous process may be reduced leading to an advantage of simplifying the process.

Then, in c), a plurality of the non-woven fabrics moved to the heating press are heated and pressurized under a temperature condition of 170° C. to 210° C. and a pressure condition of 1 MPa to 10 MPa to manufacture a core layer. The temperatures being less than 170° C. results in the problem that the binder is not sufficiently dissolved, making it difficult to achieve a strong bonding force. The temperatures being greater than 210° C. results in the problem that it is difficult to achieve the desired thickness due to excessively high temperatures. The pressure being less than 1 MPa results in the problem that the pressure is insufficient, making it difficult to achieve a desired thickness and a desired internal bonding force, and the pressure being greater than 10 MPa results in the problem that it makes the thickness lower than a desired thickness, and thickness control is difficult.

The heating press used in c) is not particularly limited as long as it is commonly used in the art, and as one specific example, a double belt press and the like may be used.

The core layer manufactured in c) may be manufactured to a thickness of 0.1 mm to 10 mm. The thickness being less than 0.1 mm results in the problem that excellent mechanical strength is difficult to maintain, and the thickness being greater than 10 mm results in the problem that moldability declines when bending the core layer or when deep drawing molding. Properties of the manufactured core layer are the same as the properties of the core layer of the present invention described above.

In addition, the method for manufacturing a core layer according to the present invention may further include, between b) and c), d) preheating for 3 minutes to 10 minutes under a temperature condition of 160° C. to 210° C.

When further including preheating as above, heat energy is applied in advance to the non-hygroscopic copolymer resin of the sheath part of the sheath-core type bicomponent fiber in the non-woven fabric, and therefore there is an advantage in that the time of the heating and pressurizing process in c) may be shortened.

The thickness of the core layer according to the present invention is preferably 0.1 to 10 mm. If the thickness is less than 0.1 mm, the resulting problem is that it is difficult to maintain excellent mechanical strength. If the thickness exceeds 10 mm, the resulting problem that moldability is deteriorated when the sandwich panel is bent or deep drawing is performed.

The skin layer 20 of the sandwich panel according to the present invention may be formed of a metal material and preferably may be formed of at least one selected from the group consisting of aluminum, iron, stainless steel (SUS), magnesium and electro galvanized steel sheet (EGI). As an example, the skin layer 20 comprising an electro galvanized steel sheet (EGI) can be applied to the sandwich panel to have good formability and bending strength. In addition, the skin layer 20 containing aluminum can be applied to the sandwich panel to achieve weight lightening.

The thickness of the skin layer 20 may be 0.1 to 0.5 mm. If the thickness is less than 0.1 mm, it is difficult to maintain the structural rigidity of the skin layer. If the thickness is more than 0.5 mm, the lightening effect of the sandwich panel is reduced, and the raw material cost increases.

The adhesive layer of the sandwich panel according to the present invention is applied between the core layer 10 and the skin layer 20 to bond the core layer 10 and the skin layer 20 together. It is preferable that the adhesive layer is applied in a uniform thickness in consideration of viscosity. In the present invention, the core layer 10 and the skin layer 20 are laminated and then cured to produce the sandwich panel, or the core layer 10 and the skin layer 20 are laminated and then thermally compressed to produce the sandwich panel. At this time, during the curing or thermal compression, the adhesive has an effect of enhancing the adhesive strength between the skin layer 20 and the core layer 10 by mechanical bonding as well as chemical bonding with the components forming the core layer 10 while penetrating into the core layer 10. The chemical bonding means that the adhesive is bonded to the upper and lower surfaces of the core layer by covalent bond, hydrogen bond, van der Waals bond, ionic bond, or the like.

The mechanical bond refers to a form in which the adhesive seeps into the core layer and is physically hooked thereto as if the rings are interdigitated with each other. This form is also called mechanical interlocking. Referring FIG. 3, due to the natural pores contained in the core layer 10, the adhesive seeps into the upper and lower surfaces of the core layer 10.

The adhesive constituting the adhesive layer may include at least one of an olefin-based adhesive, a urethane-based adhesive, an acrylic-based adhesive, and an epoxy-based adhesive. The olefin-based adhesive may be at least one selected from the group consisting of polyethylene, polypropylene, and amorphous polyalphaolefin adhesive. The urethane-based adhesive can be used without limitation as long as it is an adhesive containing a urethane structure (—NH—CO—O—). The acrylic-based adhesive may include at least one of a polymethylmethacrylate adhesive, a hydroxy group-containing polyacrylate adhesive, and a carboxyl group-containing polyacrylate adhesive. The epoxy-based adhesive may be at least one of a bisphenol-A type epoxy adhesive, a bisphenol-F type epoxy adhesive, a novolac epoxy adhesive, a linear aliphatic epoxy resin adhesive, or a cycloaliphatic epoxy resin adhesive.

In addition, the adhesive layer may comprise a first adhesive layer comprising high density polyethylene (HDPE) and a second adhesive layer comprising low density polyethylene (LDPE). At this time, the core layer and the high-density polyethylene (HDPE) adhesive are positioned to bond together, and the skin layer and the low-density polyethylene (LDPE) adhesive are positioned to bond together. Like this, the skin layer uses the LDPE adhesive to easily adhere even by relatively low heat, and in the case of the core layer, the HDPE adhesive is used to prevent the adhesives melted by heat from penetrating into the core and failing to exhibit the adhesive force, thereby improving the adhesion between the respective components.

The high density polyethylene (HDPE) may have a density of 0.940 to 0.965 $g/cm^3$ and the low density polyethylene (LDPE) may have a density of 0.910 to 0.925 $g/cm^3$.

In addition, the adhesive may comprise a photocurable adhesive, a hot melt type adhesive, or a thermosetting adhesive, and any one of a photocuring method and a thermosetting method may be used. For example, a sandwich panel can be manufactured by thermosetting a laminate including a skin layer, a core layer, and an adhesive. The thermosetting may be performed at a curing temperature of 50 to 110° C. for about 5 minutes to 2 hours, and also curing may be performed at room temperature for about 1 to 10 hours.

The adhesive layer may be applied in a thickness of about 20 to 300 μm but is not limited thereto.

The method of applying the adhesive layer to one side of the skin layer 20 may be any one selected from a die coating method, a gravure coating method, a knife coating method, and a spray coating method.

The sandwich panel according to the present invention is formed by sequentially laminating the skin layer 20, the core layer 10 and the skin layer 20, and the adhesive layer is applied and formed between the core layer 10 and the skin layer 20. After the above configurations have been laminated, the curing and compression steps may be performed, but are not limited thereto.

As mentioned above, the sandwich panel according to the present invention has excellent mechanical strength as well as formability by using a core layer having good mechanical physical properties. In addition, the transverse shear rigidity and deflection degree of the panel are improved, and thus it is suitable to use in structural materials for home appliances (TV back covers, washing machine boards, etc.), interior and exterior boards for buildings, interior and exterior materials for cars, interior and exterior materials for trains, ships and airplanes (partition boards, etc.), various partition boards, elevator structural materials, panels used to form shipping containers, and the like.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also belong to the attached claims.

Example: Examples 1 to 4 and Comparative
Examples 1 to 6

(1) Manufacture of Core Layer

Manufacturing Example 1

A polyethylene terephthalate (PET) fiber (Toray Chemical, RPF, Fineness of 4 deniers, Fiber length of 51 mm) and a sheath-core type PET fiber (TORAY CHEMICAL, EZBON-L, Fineness of 4 deniers, Sheath part melting point of 164° C., Fiber length of 64 mm) as a sheath part, which is a non-hygroscopic resin, were prepared and they were mixed at a weight ratio of 30:70.

The mixed fibers were carded with a carding machine and heat-sealed at a temperature of 190° C. for 10 seconds using a hot press to produce a nonwoven fabric.

After the nonwoven fabric was mounted on six unwinders, six nonwoven fabrics were placed in a preheating chamber having a temperature of 180° C. in the chamber and then preheated for 3 minutes.

Thereafter, the non-woven fabric was transferred to a double belt press at a speed of 5 m/min. At this time, the heating temperature of the double belt press was 180° C. and the pressure was 5 MPa. The core layer of 4 mm thickness was manufactured by heating/pressurizing for 2 minutes.

Manufacturing Example 2

A core layer was prepared in the same manner as in Example 1, except that polyethylene terephthalate (PET) fibers and sheath-core type PET fibers (sheath part is non-hygroscopic), were mixed at a weight ratio of 50:50.

Manufacturing Example 3

A core layer was prepared in the same manner as in Example 1, except that a sheath-core type PET fiber (TORAY CHEMICAL, EZBON-L, fineness 4 denier, melting point of sheath 110° C., fiber length 64 mm), which is a non-hygroscopic resin, was used.

Manufacturing Example 4

A polyethylene terephthalate (PET) fiber (Toray Chemical, RPF, Fineness of 4 deniers, Fiber length of 51 mm) and a sheath-core type PET fiber (TORAY CHEMICAL, EZBON-L, Fineness of 4 deniers, Sheath part melting point of 164° C., Fiber length of 64 mm) as a sheath part, which is a non-hygroscopic resin, were prepared and they were mixed at a weight ratio of 30:70.

After mixing the fibers, the carding was performed using a carding machine, and then a non-woven fabric with a basis weight of 1950 gsm was manufactured through a needle punching process at a punching number of 500 times per minute, a non-woven fabric moving speed of 2 m/min, and a punching density of 200 punches/cm$^2$.

The non-woven fabrics were mounted on two unwinding apparatuses, and the needle punching process was repeated at a punching number of 500 times per minute, a non-woven fabric moving speed of 2 m/min, and a punching density of 200 punches/cm$^2$ to form a physical re-bonding between the non-woven fabrics.

The non-woven fabric bonded by needle punching was placed in a preheating chamber having a temperature of 180° C. in the chamber and then preheated for 3 minutes.

Thereafter, the non-woven fabric was transferred to a double belt press at a speed of 5 m/min. At this time, the heating temperature of the double belt press was 180° C. and the pressure was 5 MPa. The core layer of 5.7 mm thickness was manufactured by heating/pressurizing for 2 minutes.

Comparative Manufacturing Example 1

A polyethylene terephthalate (PET) fiber (Toray Chemical, RPF, Fineness of 4 deniers, Fiber length of 51 mm) were carded with a roller carder and thermally adhered at 190° C. for 10 seconds using a hot press to produce a nonwoven fabric.

After the seven nonwoven fabrics were prepared, a polyester-based hot-melt adhesive film (chemitec KOREA, PE) as a hygroscopic copolymer was placed between the respective nonwoven fabrics, and then the nonwoven fabric was subjected to a double belt press at a speed of 5 m/min. At this time, the heating temperature of the double belt press was 110° C. and the pressure was 5 MPa, and the core layer having a thickness of 5.5 mm was produced by heating/pressurizing for 2 minutes.

Comparative Manufacturing Example 2

After mixing a glass fiber to a polyethylene terephthalate (PET) fiber (Toray Chemical Inc., RPF, fineness 4 denier, fiber length 51 mm) in a weight ratio of 1:1, the result went through carding using a roller carding machine to prepare a card web, and then after overlapping 6 of these webs, the result was transferred to a conveyer belt equipped with a steam spray nozzle. After that, high temperature steam was sprayed from the steam spray nozzle in a thickness direction of the card web, and the result was passed through a web thickness adjusting roll to manufacture a molded object having a thickness of 4 mm.

Comparative Manufacturing Example 3

Instead of PET fiber, a mixture of polyethylene (PE) resin and magnesium hydroxide ($Mg(OH)_2$) was extruded to prepare a core layer having a thickness of 4 mm at a melting point of 130° C.

Comparative Manufacturing Example 4

After mixing the fibers as in Manufacturing Example 4, the carding was performed using the carding machine, and then a non-woven fabric having a basis weight of 1300 gsm was manufactured by thermal bonding at 190° C. for 10 seconds without the needle punching process.

The non-woven fabrics were mounted on three unwinding apparatuses, and three non-woven fabrics were placed in a preheating chamber having a temperature of 180° C. in the chamber, followed by preheating for 3 minutes.

Thereafter, the non-woven fabric was transferred to a double belt press at a speed of 5 m/min. At this time, the heating temperature of the double belt press was 180° C. and the pressure was 5 MPa. The core layer of 5.7 mm thickness was manufactured by heating/pressurizing for 2 minutes.

(2) Manufacture of Sandwich Panel

Example 1

An epoxy adhesive (Kukdo Chemical) was applied to both sides of the prepared core layer manufactured in Manufacturing Example 1, and then an aluminum skin layer (AL 3003) formed of electro galvanized steel sheet was formed to a thickness of 0.5 mm. Thereafter, the laminate resulted was thermosetted at 100° C. to produce a sandwich panel.

Example 2

A sandwich panel was manufactured in the same manner as in Example 1 except that the core layer manufactured in manufacturing Example 2 was used.

Example 3

A sandwich panel was manufactured in the same manner as in Example 1 except that the core layer manufactured in manufacturing Example 3 was used.

Example 4

An epoxy adhesive (Kukdo Chemical) was applied to both sides of the prepared core layer manufactured in Manufacturing Example 4, and then an aluminum skin layer (AL 3003) formed of electro galvanized steel sheet was formed to a thickness of 0.4 mm. Thereafter, the laminate resulted was thermosetted at 100° C. to produce a sandwich panel.

Comparative Example 1

A sandwich panel was manufactured in the same manner as in Example 1, except that the core layer manufactured in Comparative manufacturing Example 1 was used.

Comparative Example 2

A sandwich panel was manufactured in the same manner as in Example 1, except that the core layer manufactured in Comparative manufacturing Example 2 was used.

Comparative Example 3

A sandwich panel was manufactured in the same manner as in Example 1 except that the core layer manufactured in Comparative manufacturing Example 3 was used in a thickness of 0.8 mm.

Comparative Example 4

A sandwich panel was manufactured in the same manner as in Example 1, except that the core layer manufactured in Comparative manufacturing Example 3 was used in a thickness of 6.0 mm and the skin layer was formed in a thickness of 1.0 mm.

Comparative Example 5

A core layer of a thickness of 5.0 mm was prepared with a HDPE foam resin (LUTENE-H, LG Chem) using an extruder (Bautech, BA-11). (Manufacturing condition: Screw speed of 40 rpm, Temperature of 160° C.)

An epoxy adhesive (Kukdo Chemical) was applied to both sides of the prepared core layer, and then an aluminum skin layer (AL 3003) formed of electro galvanized steel sheet was formed to a thickness of 0.5 mm. Thereafter, the laminate resulted was thermosetted at 100° C. to produce a sandwich panel.

Comparative Example 6

An epoxy adhesive (Kukdo Chemical) was applied to both sides of the prepared core layer manufactured in Comparative Manufacturing Example 4, and then an aluminum skin layer (AL 3003) formed of electro galvanized steel sheet was formed to a thickness of 0.4 mm. Thereafter, the laminate resulted was thermosetted at 100° C. to produce a sandwich panel.

Experimental Example 1: Measurement of Physical Property of Panel

After preparing each of the sandwich panel manufactured in Examples 1 to 3 and Comparative Examples 1 to 4 into a specimen, measurements were made using the following methods, and the results are shown in the following Table 1.

(1) Flexural strength (MPa): Flexural strength of sandwich panel were measured based on the ASTM C393.

(2) flexural modulus (GPa): flexural modulus of sandwich panel were measured based on the ASTM C393.

(3) Bending strength (N/mm$^2$): Bending strength of sandwich panel with 3-point-bending were measured based on the KS F4737.

(4) Lightening weighting ratio (%): The lightening ratio was measured on the basis of the same metal of the same thickness as in the above examples.

(5) Coefficient of linear expansion (ppm/K): The coefficient of linear expansion (ACL) of the adhesive layer, the coefficient of linear expansion (CCL) of the core layer, and the coefficient of linear expansion (SCL) of the skin layer were measured using TMA-SDTA 841 equipment (Mettler Toledo) for a specimen of 15 mm×6 mm×0.5 mm.

(6) Surface roughness (Ra, μm): The prepared specimen was manufactured to a size of 300 mm×300 mm, and then a surface roughness measuring instrument (Mitutoyo SJ-210 model) was placed. Surface roughness (Ra) was measured, and the surface roughness parameter Ra (mu m) was numerically expressed.

(7) Peel-off strength (N): The prepared specimen was manufactured to a size of 300 mm×25 mm, and then measurements were made 2 times based on the KSF 4737, and the average value was measured.

TABLE 1

|  | Example | | | Comparative Example | | | |
| --- | --- | --- | --- | --- | --- | --- | --- |
|  | 1 | 2 | 3 | 1 | 2 | 3 | 3 |
| Flexural strength | 293 | 285 | 275 | 261 | 262 | 253 | 177 |
| flexural modulus | 170 | 168 | 160 | 150 | 152 | 145 | 102 |
| Bending strength | 118 | 112 | 109 | 101 | 99 | 102 | 71 |

TABLE 1-continued

|  | Example | | | Comparative Example | | | |
| --- | --- | --- | --- | --- | --- | --- | --- |
|  | 1 | 2 | 3 | 1 | 2 | 3 | 3 |
| Lightening weighting ratio | 44 | 44 | 43 | 43 | 42 | 42 | 60 |
| SCL | 9.12 | 9.21 | 9.31 | 9.23 | 9.29 |  | 9.17 |
| CCS | 36.07 | 39.12 | 43.87 | 61.28 | 72.1 |  | 79.4 |
| ACL | 93.21 | 91.33 | 92.23 | 92.34 | 93.21 |  | 92.11 |
| ACL/CCL | 2.58 | 2.33 | 2.10 | 1.51 | 1.29 |  | 1.16 |
| CCL/SCL | 3.96 | 4.25 | 4.71 | 6.64 | 7.76 |  | 8.66 |
| Surface roughness | 8 | 9 | 7 | 13 | 12 |  | 4 |
| Peel-off strength 1$^{st}$ | 169.5 | 171.2 | 167.3 | 152.3 | 149.1 |  | 147.8 |
| Peel-off strength 2rd | 175.3 | 172.3 | 168.9 | 153.7 | 150.3 |  | 147.4 |

As shown in Table 1, in the case of the sandwich panels of Examples 1 to 3, not only the Flexural strength, flexural modulus and Bending strength was increased but also the Lightening weighting ratio by 44% compared to the conventional sandwich panel increased and the peel strength remarkably increased. It can be seen that this result is due to the fact that the mechanical strength of the sandwich panel is improved by controlling the surface roughness of the core layer to a certain level by including the core layer having excellent mechanical strength.

On the other hand, it can be seen that Comparative Examples 1 and 2 prepared by a wet process using the hygroscopic copolymer resin instead of the core layer of the present invention are relatively lower than those of Examples 1 to 3. It is also confirmed that Comparative Examples 3 to 4 using a core layer in which polyethylene (PE) resin and magnesium hydroxide (Mg(OH)$_2$) are mixed is also lower than those of Examples 1 to 3.

In addition, in Comparative Examples 1 to 3 in which the surface roughness does not satisfy the range of the present invention, unlike the sandwich panel of the present invention, it can be confirmed that the peel strength is relatively lower than the results of Examples 1 to 3.

Experimental Example 2: Measurement of Physical Property of Panel

The sandwich panels prepared in Example 4 and Comparative Examples 5 and 6 were prepared as specimens and measured by the following method.

As shown in FIG. 4, a 3-point bending sample was prepared and cut to obtain a test sample having a length of 200 mm and a width of 75 mm.

Specifically, the 3-point mid-span loading was measured once in each of conditions of a span (S1) of 100 mm and a span (S2) of 150 mm under the condition of loading (P) of 2,000 N, according to ASTM D7250

Flexural stiffness and transverse shear rigidity were determined using the measured values.

The flexural stiffness is obtained by the D value of the following Equation 1 and the transverse shear rigidity is obtained by the U value of Equation 2 below.

$$D = \frac{P_1 S_1^3 (1 - S_2^2/S_1^2)}{48\Delta_1 (1 - P_1 S_1 \Delta_2 / P_2 S_2 \Delta_1)} \quad \text{(Equation 1)}$$

$$U = \frac{P_1 S_1 (S_1^2/S_2^2 - 1)}{4\Delta_1 ((P_1 S_1^3 \Delta_2 / P_2 S_2^3 \Delta_1) - 1)} \quad \text{(Equation 2)}$$

wherein,
$\Delta$ is a beam mid-span deflection (mm),
P is a total applied force (N),
d is a sandwich thickness (mm),
b is a sandwich width (mm),
S is a support span length (mm),
L is a load span length (mm),
G is a core shear modulus (MPa),
D is a flexural stiffness (N*mm$^2$),
U is a transverse shear rigidity (N).

The flexural stiffness and transverse shear rigidity of the sandwich panel as obtained above were measured and are shown in Table 2 below.

TABLE 2

|  | Flexural stiffness (kN * mm$^2$) | Transverse shear rigidity (N) |
| --- | --- | --- |
| Comparative Example 5 | 111,636 | 35,585 |
| Comparative Example 6 | 110,544 | 43,524 |
| Example 4 | 109,446 | 59,984 |

Referring to Table 2, it can be seen that in the case of the sandwich panel of Example 4, although the flexural stiffness is similar to that of the sandwich panel of Comparative Example 5, transverse shear rigidity is improved by nearly 70%, and transverse shear rigidity is improved by 37% or more compared to the sandwich panel of Comparative Example 6.

Also, the deflection degrees of the sandwich panel under the condition of loading (P) of 2,000 N and the condition of span value of 150 mm were shown in the following Table 3.

TABLE 3

|  | by flexural (mm) | by shear (mm) | Total (mm) |
| --- | --- | --- | --- |
| Comparative Example 5 | 1.26 | 2.11 | 3.37 |
| Comparative Example 6 | 1.28 | 1.85 | 3.03 |
| Example 4 | 1.28 | 1.25 | 2.54 |
|  |  |  | (P = 2,000N) |

Referring to Table 3, it can be seen that in the case of the sandwich panel of Example 1, the deflection degree is improved by 30% or more as compared to the sandwich panel of Comparative Example 1, and also the deflection degree is improved by 19% or more even as compared with the sandwich panel of Comparative Example 2.

It can be seen that these results are due to the fact that in the case of Example 4, the non-woven fiber structure is sterically formed by needle punching, and thus the core layer of non-woven fiber structure having excellent mechanical strength inside the core layer is used, unlike Comparative Example 5 which uses a foamed core layer and Comparative Example 6 which does not perform a needle punching process.

The invention claimed is:

1. A sandwich panel comprising
    a core layer of non-woven fiber structure having a polyester-based fiber and a binder, the core layer having an apparent density of 0.5 g/cm$^3$ to 0.8 g/cm$^3$;
    a skin layer laminated on at least one surface of the core layer; and
    an adhesive layer for bonding the core layer and the skin layer, the adhesive layer comprising a first adhesive layer comprising high density polyethylene (HDPE) and a second adhesive layer comprising low density polyethylene (LDPE),
    wherein the core layer is bonded to the first adhesive layer, and the skin layer is bonded to the second adhesive layer, and
    wherein the binder comprises a non-hygroscopic copolymer resin.

2. The sandwich panel of claim 1, wherein the polyester-based fiber has a melting point of 180 to 300° C.

3. The sandwich panel of claim 1, wherein the core layer has a flexural strength of 20 MPa to 80 MPa, a tensile strength of 50 MPa to 80 MPa, a flexural modulus of 1.0 GPa to 1.5 GPa and a tension stiffness of 1.0 GPa to 1.8 GPa, a tensile elongation of 10% to 30% and a peel-off strength of 150 N to 200 N.

4. The sandwich panel of claim 1, wherein the polyester-based fiber is any one or more selected from the group consisting of polyethylene terephthalate (PET), polytrimethylene terephthalate, polybutylene terephthalate, and polyethylene naphthalate.

5. The sandwich panel of claim 1, wherein the non-hygroscopic copolymer resin has a weight change rate of less than 0.1% after keeping a constant temperature/constant humidity for 100 hours at a temperature of 85° C. and relative humidity of 85%.

6. The sandwich panel of claim 1, wherein the binder has a melting point of 160° C. or higher.

7. The sandwich panel of claim 1, further comprising a sheath-core type bicomponent fiber, including: a core part of a second polyester-based fiber; and a sheath part which is a non-hygroscopic copolymer resin surrounding the core part.

8. The sandwich panel of claim 7, wherein the second polyester-based fiber of the core part of the sheath-core type bicomponent fiber is any one or more selected from the group consisting of polyethylene terephthalate (PET), polytrimethylene terephthalate, polybutylene terephthalate, and polyethylene naphthalate.

9. The sandwich panel of claim 7, wherein the sheath part that is a non-hygroscopic copolymer resin has a weight change rate of less than 0.1% after keeping a constant temperature/constant humidity for 100 hours at a temperature of 85° C. and relative humidity of 85%.

10. The sandwich panel of claim 1, wherein the thickness of the core layer has a range of 0.1 to 10 mm and the thickness of the skin layer has a range of 0.1 to 0.5 mm.

11. The sandwich panel of claim 1, wherein the skin layer is at least one selected from the group consisting of aluminum, iron, stainless steel (SUS), magnesium, and electro galvanized steel sheet (EGI).

12. The sandwich panel of claim 1, wherein the adhesive layer includes at least one of an olefin-based adhesive, a urethane-based adhesive, an acrylic-based adhesive, and an epoxy-based adhesive.

13. The sandwich panel of claim 1, wherein the density of the high density polyethylene (HDPE) has a range of 0.940 to 0.965 g/cm$^3$, and the density of the low density polyethylene (LDPE) has a range of 0.910 to 0.925 g/cm$^3$.

14. The sandwich panel according to claim 1, wherein the core layer is produced through the needle punching process at a punching number of 300 to 1000 times per minute, a non-woven fabric moving speed of 1 to 8 m/min, and a punching density of 100 to 500 punches/cm$^2$.

15. The sandwich panel according to claim 14, wherein the core layer is manufactured by repeating two or more needle punching processes.

16. A method for manufacturing the sandwich panel of claim 1, comprising:
    a) preparing a core layer of non-woven fiber structure having a polyester-based fiber and a binder which has an apparent density of 0.5 g/cm$^3$ to 0.8 g/cm;
    b) forming an adhesive layer on at least one surface of the core layer; and
    c) forming a skin layer on the adhesive layer.

17. The method of claim 16, wherein the step c) includes forming a skin layer by photo-curing or thermal-curing after laminating the core layer, the adhesive layer, and the skin layer.

18. The method of claim 17, wherein the thermal-curing is performed at a temperature of 50 to 110° C. for 5 minutes to 2 hours.

19. The method of claim 17, wherein the thermal-curing is performed at room temperature for 1 to 10 hours.

20. The method of claim 16, wherein the step a) comprises:
    a1) preparing a non-woven fiber; and
    a2) performing a needle punching process on the non-woven fiber at a punching number of 300 to 1000 times per minute, a non-woven fabric moving speed of 1 to 8 m/min, and a punching density of 100 to 500 punches/cm$^2$ to produce the core layer.

21. The method of claim 20, wherein, in the step a2), the needle punching process is performed on the non-woven fiber at a punching number of 400 to 700 times per minute, a non-woven fabric moving speed of 1.5 to 6 m/min, and a punching density of 200 to 400 punches/cm$^2$.

* * * * *

UNITED STATES PATENT AND TRADEMARK OFFICE
CERTIFICATE OF CORRECTION

PATENT NO.      : 11,225,056 B2
APPLICATION NO. : 16/861855
DATED           : January 18, 2022
INVENTOR(S)     : Won Kim et al.

Page 1 of 1

It is certified that error appears in the above-identified patent and that said Letters Patent is hereby corrected as shown below:

On the Title Page

After Related U.S. Application Data, (60):
"continuation" should read --continuation-in-part--

Continuing on page 2:
"filed on Jun. 2, 2017" should read --filed on Jun. 12, 2017--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*